US006239405B1

(12) United States Patent
Jones et al.

(10) Patent No.: US 6,239,405 B1
(45) Date of Patent: May 29, 2001

(54) DISPLACEMENT CONTROLLED BUTT WELDING

(75) Inventors: Marshall Gordon Jones, Scotia; Carl Edward Erikson, Schenectady, both of NY (US); Martin Norman Hassink, Macedonia, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/253,917

(22) Filed: Feb. 22, 1999

(51) Int. Cl.[7] .................................................. B23K 26/22
(52) U.S. Cl. ................................ 219/121.63; 219/121.64
(58) Field of Search .................................... 219/101, 103, 219/104, 121.64, 121.63

(56) References Cited

U.S. PATENT DOCUMENTS 4,129,771 * 12/1978 Pinettes et al. ...................... 219/104
4,217,478 * 8/1980 Kuchuk-Yatsenko et al. ...... 219/101
4,266,119 * 5/1981 Best .................................... 219/104
4,296,305 * 10/1981 Lifshits et al. ...................... 219/101

FOREIGN PATENT DOCUMENTS

2126511 * 3/1984 (GB) .
1609576 * 11/1990 (RU) .................................. 219/101

* cited by examiner

*Primary Examiner*—Geoffrey S. Evans
(74) *Attorney, Agent, or Firm*—Patrick K. Patnode; Marvin Snyder

(57) ABSTRACT

Two parts are coaxially aligned at opposing face ends. The parts are temporarily compressed together at the face ends during welding thereof to control size of the resulting weld joint. Temporary compression may be effected by applying a compression force through the parts to abut together the face ends, and then limiting plastic displacement of the parts at the weld joint during welding. The displacement control limits radial expansion at the weld joint in a preferred embodiment.

20 Claims, 5 Drawing Sheets

DISPLACEMENT CONTROLLED BUTT WELDING

BACKGROUND OF THE INVENTION

The present invention relates generally to welding, and, more specifically, to butt welding.

A ceramic metal halide (CMH) lamp includes a cylindrical arc tube having substantially closed ends from which extend smaller tubular sockets. An electrode assembly is mounted in each of the sockets and includes an electrode tip suspended inside the arc tube. The tube is filled with a suitable gas and the sockets are sealed so that when electrical current is conducted through the electrode assemblies a light emitting arc is produced inside the tube. Since the operating temperature of the lamp is substantial, the electrode assemblies must be formed of suitable materials for withstanding the elevated temperature.

For example, the electrode tip may include a shank and coil of tungsten. The tungsten tip is joined coaxially to refractory or ceramic-metal composite lead wires which extend through the tube sockets. In one embodiment, the tungsten tip is joined to a molybdenum wire, or a wire formed of cermet which is an alloy of molybdenum and alumina. This wire in turn is joined to a niobium wire for forming a three-part electrode assembly that extends through each of the two tube sockets.

The components of the electrode assembly should be joined together with suitable strength for withstanding the high temperature operation of the lamp, which may be effected by welding together the three parts at two corresponding welding joints. Experience has shown that higher strength welds of these parts may be obtained by imposing an axial compression load between the parts during the welding process. In this way, the parts are forced together during the welding process to ensure intimate contact therebetween throughout the welding process for achieving a complete welding bond without the use of a filler material.

However, since one or both of the two parts being welded together at each joint will locally melt, the applied compression force can cause undesirable plastic mushrooming at the weld joint with radially outward expansion thereat. The resulting weld joint, or nugget, is correspondingly larger in diameter than that of the adjacent parts.

Such weld nuggets are undesirable in the manufacture of CMH lamps since the lamp sockets are relatively small in diameter for receiving therethrough the electrode assemblies in a close-tolerance fit. For example, the inner diameter of the tube socket may be as little as about 1 mm, with the corresponding outer diameter of the electrode assembly being about 0.1 mm smaller in its outer diameter. Accordingly, a radially expanded weld nugget can prevent the electrode assembly from being inserted axially through the tube socket during the manufacturing process, thus rendering it defective.

Accordingly, it is desired to provide an improved process for welding together wire parts without substantially increasing the diameter thereof at the weld joint.

BRIEF SUMMARY OF THE INVENTION

Two parts are coaxially aligned at opposing face ends. The parts are temporarily compressed together at the face ends during welding thereof to control size of the resulting weld joint. Temporary compression may be effected by applying a compression force through the parts to abut together the face ends, and then limiting plastic displacement of the parts at the weld joint during welding. The displacement control limits radial expansion at the weld joint in a preferred embodiment.

DETAILED DESCRIPTION OF THE INVENTION

Figure 1:
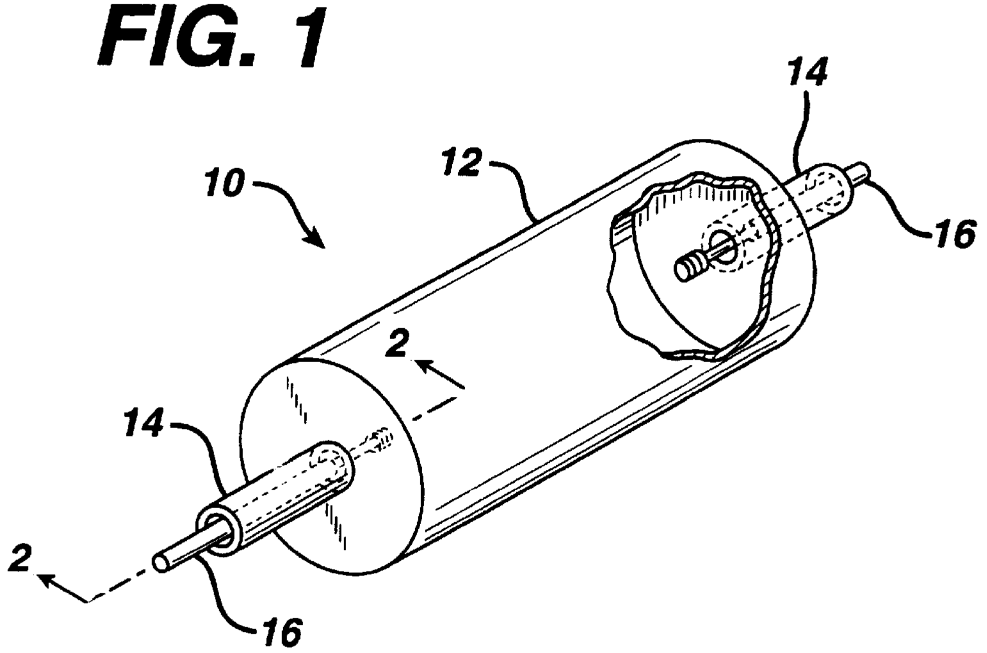
FIG. 1 is an isometric view of an exemplary CMH lamp having a pair of electrode assemblies mounted in corresponding sockets thereof, with the assemblies being welded in accordance with an exemplary embodiment of the present invention.

Illustrated in FIG. 1 is an exemplary ceramic metal halide (CMH) lamp 10 having a cylindrical arc tube 12 closed at opposite axial ends, with corresponding tubular sockets 14 thereat. Extending through each of the sockets is an axially elongate electrode assembly 16 sealingly joined in the sockets 14 for confining a gas inside the tube 12. During operation, electrical current is carried through the two electrode assemblies 16 for producing an electrical arc inside tube 12 for producing illumination light.

Figure 2:
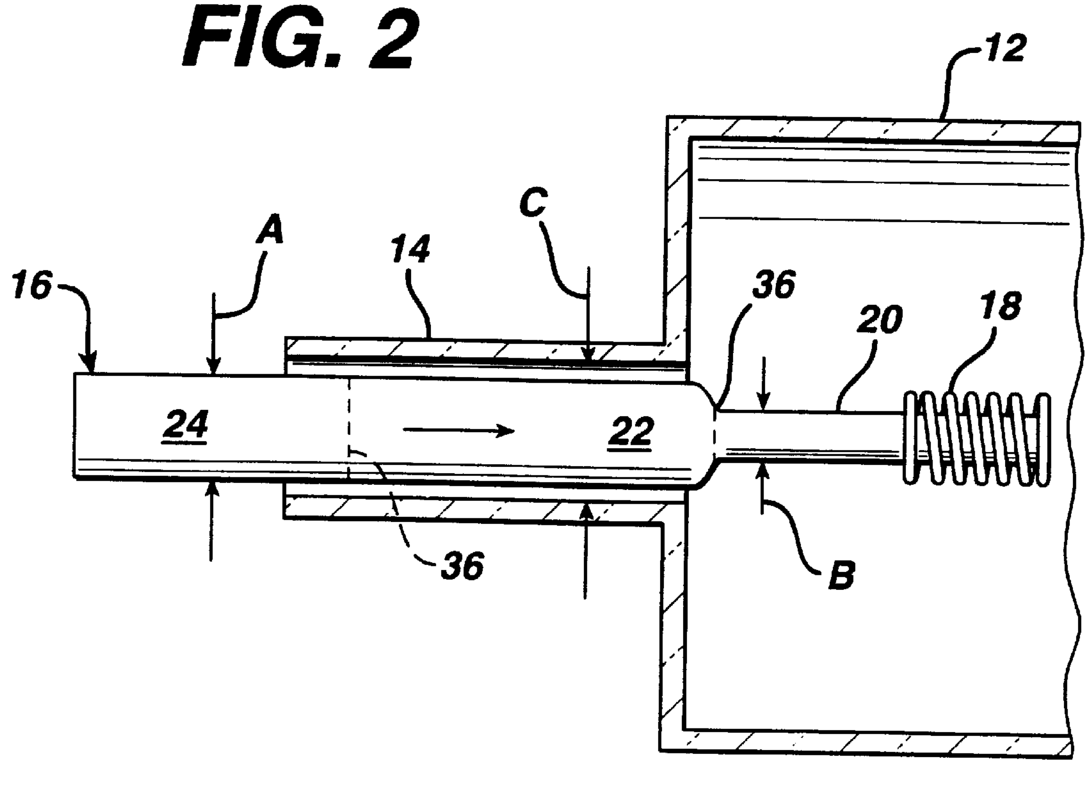
FIG. 2 is an enlarged axial sectional view of one end of the lamp illustrated in FIG. 1 and taken along line 2—2 illustrating an exemplary electrode assembly welded in accordance with the present invention.

FIG. 2 illustrates in more detail electrode assemblies 16 mounted in a corresponding socket 14. Electrode 16 is an assembly of parts including a coil or overwind 18 wrapped around a solid shank 20 to define an electrode tip. Shank 20 is fixedly joined to a relatively short first part or lead wire 22, lead wire 22 in turn is fixedly joined to another relatively short second part or lead wire 24. The electrode parts are coaxially aligned end to end along a common axial centerline axis.

First and second wires 22, 24 preferably have the same outer diameter A, with shank 20 having a suitably smaller outer diameter B. Coil 18 may have any suitable size typically no larger than the diameter of the two lead wires 22, 24.

The so configured electrode accordingly has a straight and slender profile and may be inserted axially through tube socket 14 during assembly and then sealed thereto. Socket 14 has a tubular bore with an inner diameter C that is preferably only slightly larger than the diameter A of the lead wires. For example, the socket inner diameter C may be about 1 mm, and the outer diameter A of lead wires 22, 24 may be about 0.1 mm smaller for providing a close fit therebetween during assembly.

In an exemplary embodiment illustrated in FIGS. 1 and 2, electrodes 16 are formed of refractory materials for accommodating the high temperature environment during lamp operation with corresponding high strength. For example, wire shank 20 and coil 18 may be formed of tungsten. First lead wire 22 may be formed of molybdenum, or cermet, a molybdenum and alumina composite. Second lead wire 24 may be formed of niobium.

In accordance with the present invention, shank 20, first lead wire 22, and second lead wire 24 are welded together to form electrode 16 for CMH lamp 10 without the corresponding weld joints mushrooming during the welding process to prevent or obstruct axial assembly of the electrodes through corresponding sockets 14.

Figure 3:
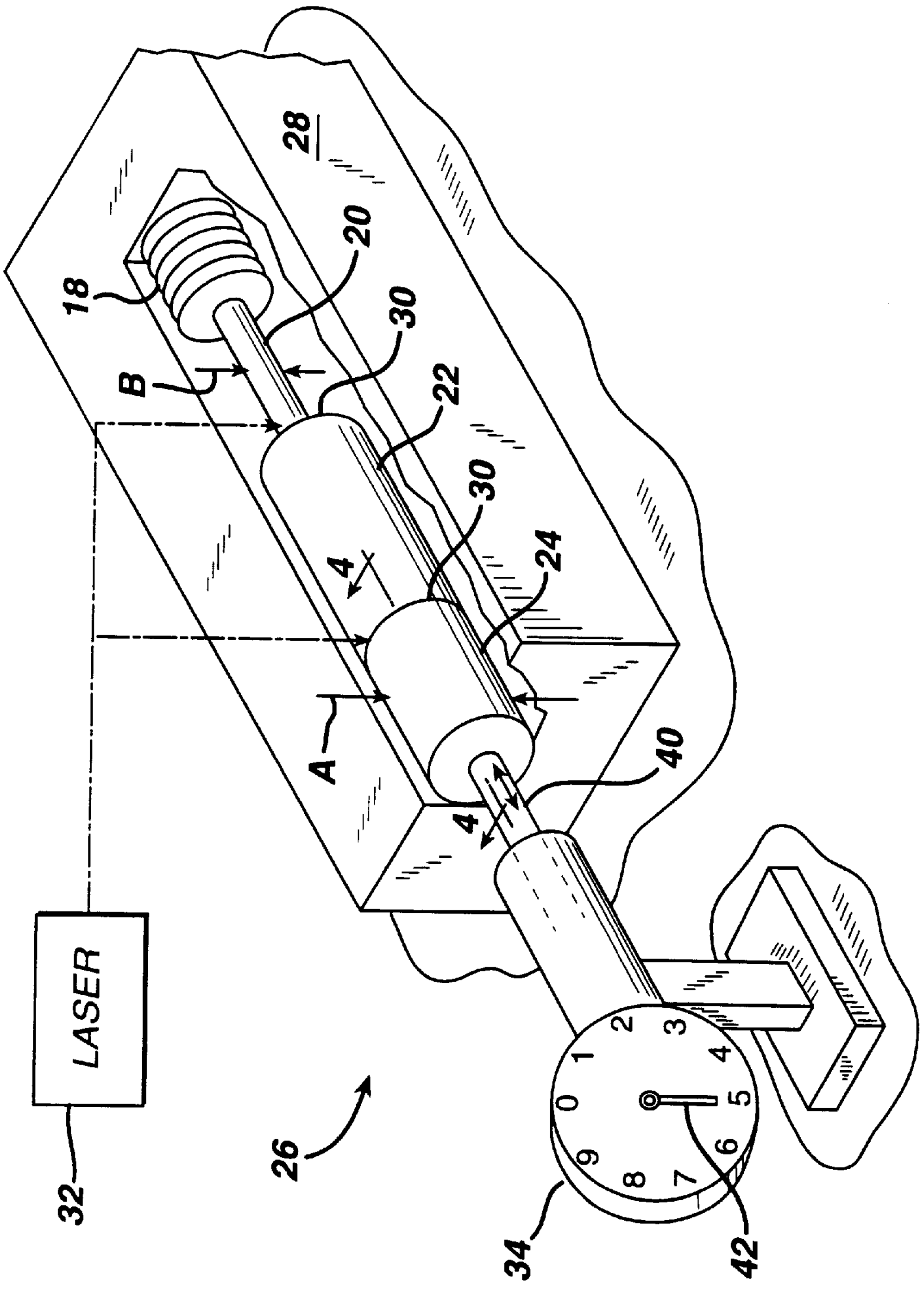
FIG. 3 is a schematic representation of the electrode assembly illustrated in FIG. 2 mounted in a fixture for being welded in accordance with an exemplary embodiment of the present invention.
Figure 4:
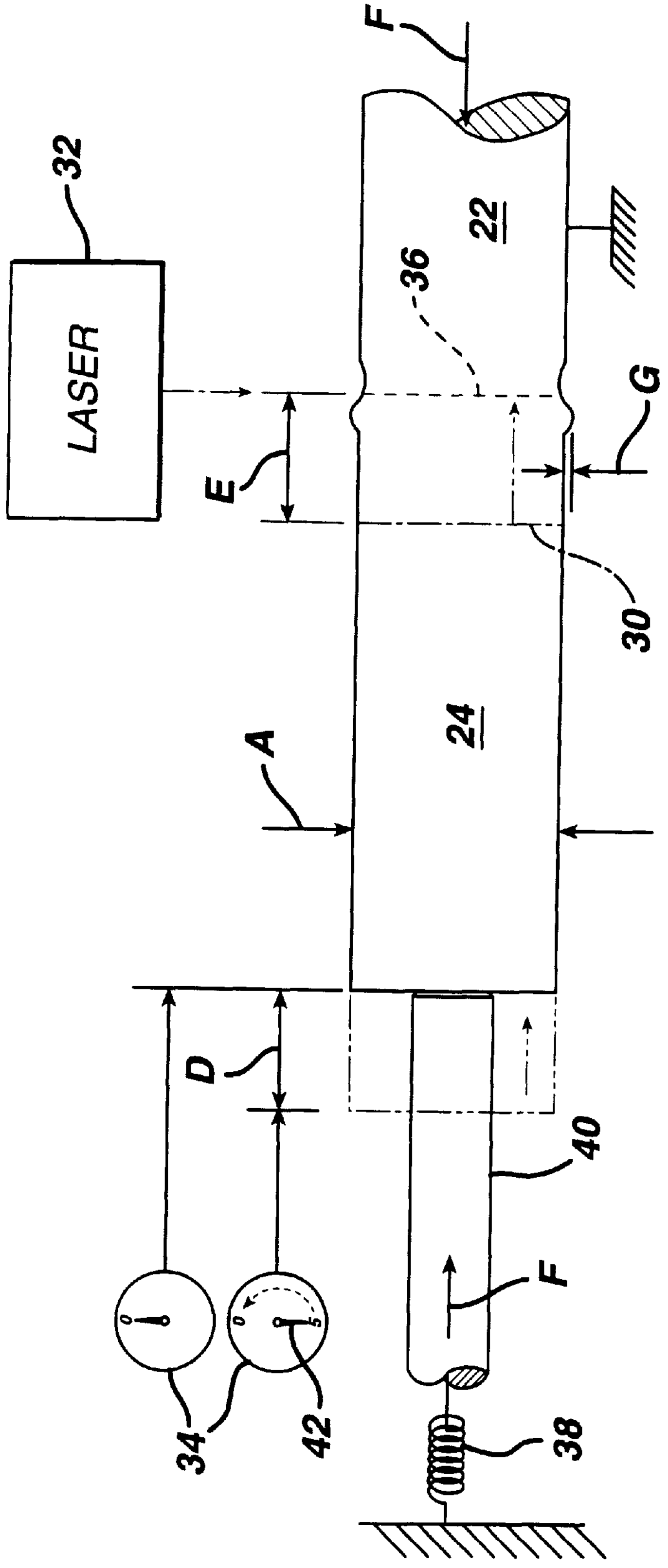
FIG. 4 is a schematic view of a portion of the electrode assembly illustrated in FIG. 3 and taken along line 4—4 to illustrate temporary compression of two adjoining parts during the welding process.

More specifically, FIG. 3 illustrates an exemplary apparatus 26 for welding together in suitable turn first part 22 to second part 24, and shank 20 to first part 22 in a method which limits radial mushrooming of the corresponding weld joints. The electrode components may be initially supported in an elongate trench of a fixture 28 for being welded together. FIG. 4 illustrates first and second parts 22, 24 immediately after the welding process. And, FIG. 5 illustrates an exemplary embodiment of the welding process in flowchart form.

Figure 5:
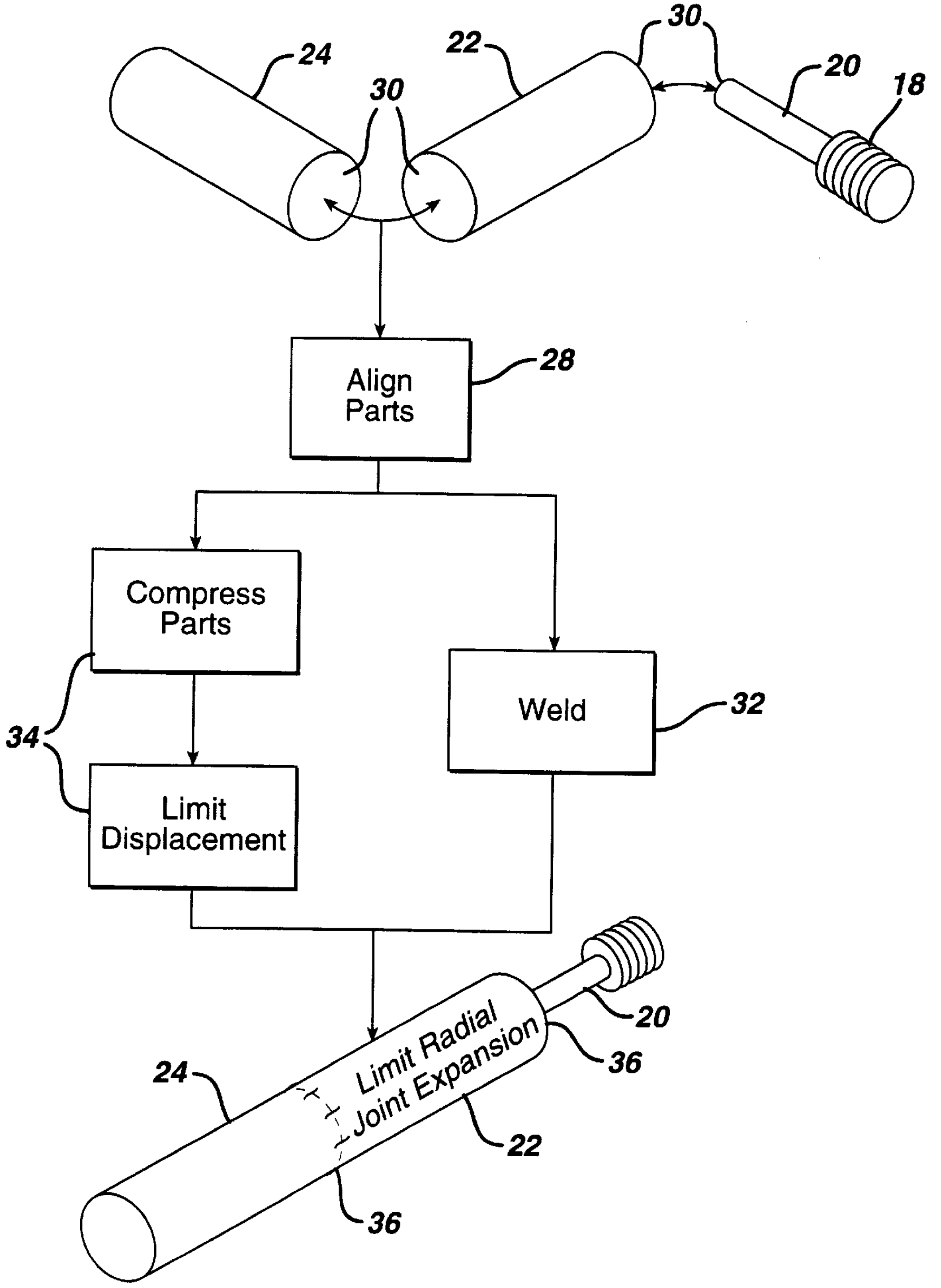
FIG. 5 is a flowchart representation of the welding process in accordance with an exemplary embodiment of the present invention.

The process begins by coaxially aligning together any two or more of the parts 20, 22, 24 at opposing face ends 30 thereof as shown in FIGS. 3 and 5. Fixture 28 illustrated in FIG. 3 is one example of suitable means for coaxially aligning the electrode parts together along a common axial centerline axis, with the trench in the fixture being suitably configured for supporting the different electrode parts.

In the exemplary embodiment illustrated in FIG. 3, coil 18 is pre-joined on shank 20 and then coaxially aligned with first and second wires 22, 24. The parts may be otherwise aligned together in any suitable manner such as individually holding the separate parts in alignment with each other.

Once aligned, the parts may be butt welded together at the respective face ends 30 using any suitable welding means 32 such as a pulsed neodymium (Nd):yttrium-aluminum-gamet (YAG) laser. Laser welding has the advantage of locally applying heat at the abutting face ends 30 for welding together the corresponding parts without the need for filler material in the preferred embodiments.

As indicated above in the Background section, the refractory materials of the electrode are best welded together under axial compression, yet it is undesirable to allow that axial compression to plastically mushroom or expand the resulting weld joint or nugget. Accordingly, the parts being welded are temporarily compressed together in abutment at the face ends during the welding process to control size of the resulting weld joints.

More specifically, FIG. 3 illustrates means in the exemplary form of a conventional dial indicator 34 that is effective for compressing together the parts temporarily during welding. As shown in FIG. 4, dial indicator 34 is effective for applying an axial compression force F through the aligned electrode parts to abut together face ends 30 thereof, and then controlling plastic deformation or displacement of the parts at the weld joint during welding.

As shown in FIG. 4, welding laser 32 emits a laser beam at the adjoining face ends 30 which provides sufficient heat to locally melt at least one of the two parts thereat to form the resulting weld joint 36 which solidifies upon cessation of laser welder 32.

Dial indicator 34 is effective for both imparting the compression force F on the parts, as well as controlling or limiting axial plastic contraction of the parts at the weld joint during welding thereof.

As indicated schematically in FIG. 4, dial indicator 34 includes an internal spring 38 that applies the compression force F through an extendible probe or shaft 40. Dial indicator 34 also includes an indicator 42 in the form of a rotating needle that indicates the precise amount of compression to second part 24.

During operation, shaft 40 is coaxially aligned with the parts being welded, with spring 38 being initially loaded or compressed under a retraction displacement D that is preselected to be equal to the axial contraction limit E at weld joint 36.

The axial contraction limit E is preselected for controlling or limiting radial plastic expansion G at weld joint 36, which expansion is the increase in radius or diameter of the parts thereat relative to the pre-welded outer diameter A.

Mushrooming of two parts at butt weld 36 is related to the initial outer diameters of the two parts, their material composition, and the amount of axial plastic contraction effected by the applied compression force F. In order to limit the radial expansion G at weld joint 36, a corresponding value of the axial contraction limit E may be obtained through experience and qualification testing. For example, the axial contraction limit E may be selected to ensure that the radial expansion G of the resulting weld joint 36 does not exceed a specified value such as about a 3% increase in diameter.

The axial contraction limit E is accurately controlled by correspondingly controlling the initial retraction D of dial indicator shaft 40. If the retraction D is less than the desired contraction limit E the resulting weld joint 36 may not expand, but may have undesirably low strength. If the initial retraction D is greater than the desired contraction limit E, the resulting weld joint 36 will have suitable strength, but with undesirable radial expansion exceeding the desired limit.

In a preferred embodiment, the initial retraction D of the probe is preselected to equal the desired axial contraction limit E. In this way, as the parent material is melted during welding of joint 36, probe 40 maintains the compression force F until the initial retraction D thereof is expended as the tip of the probe returns to an unretracted position. Plastic compression at weld joint 36 is therefore limited solely to the amount of initial retraction D of dial indicator probe 40. The so extended probe is thus unable to further apply any compression force on the parts, nor to further axially contract the parts during the welding process when the parent material is in a molten state.

Accordingly, the compression force F is automatically removed from the parts when they reach their axial contraction limit E since dial indicator probe 40 simultaneously reaches its fully extended position expending the initial retraction D.

A particular advantage of using dial indicator 34 is the ability in one device to both apply the desired compression force on the initially abutting parts and control axial displacement therebetween to prevent excessive mushrooming of the weld joint.

Another advantage of using a conventional dial indicator is the indicators ability to provide a relatively constant compression force on the parts over the entire retraction range of probe 40, including immediately prior to the full extension of the probe. Furthermore, the dial indicator spring 38 may be readily removed and substituted by different springs having various spring rates or constants as desired for use in controlling the welding process of the abutting parts. The spring is selected to effect a compression force suitably larger than the friction forces between the parts being welded and their supporting fixtures for permitting the controlled displacement thereof.

Instead of using a dial indicator and associated compression spring, other suitable techniques may be used for temporarily applying the compression force such as by using hydraulic or pneumatic controlled extension rods having cooperating axial extension limits.

As shown in FIG. 4, two wires 22, 24 may have substantially equal maximum outer diameters A at abutting face ends 30 thereof, and the displacement control effected by the axial contraction limit E limits radial expansion G at weld joint 36 to about the initial outer diameter A within up to about a 3% increase thereover. This increase represents about a third of the available radial gap between lead wires 22, 24 inside tube socket 14, and permits axial assembly therethrough without obstruction.

As shown in FIG. 3, shank 20 may be similarly welded to first lead wire 22, with these two parts having unequal outer diameters, with the outer diameter B of shank 20 being substantially less than the outer diameter A of first wire 22. Although shank 20 is smaller in diameter than first wire 22, excessive compression force during welding can nevertheless undesirably radially expand the resulting weld joint.

Furthermore, since shank 20 is tungsten, and first wire 22 is molybdenum or cermet, welding is effected differently than the weld between first lead wire 22 and niobium second lead wire 24. Accordingly, a different value of the axial contraction limit E is required for the weld between shank 20 and first wire 22 than between first wire 22 and second wire 24.

For example, the axial contraction limit E for the cermet-tungsten joint is less than about 0.2 mm, and less than about 0.05 mm for the cermet-niobium joint. The larger contraction limit E for the cermet-tungsten weld joint is required in part because tungsten shank 20 does not melt during the welding operation whereas only the cermet first wire 22 melts. A smaller contraction limit E for the cermet-niobium weld joint is preferred since both components melt during welding and therefore increase the likelihood of mushrooming without suitable displacement control.

Accordingly, displacement controlled welding of the various parts of electrode 16 may be effected irrespective of the magnitude of the applied compression force for limiting weld joint radial expansion while ensuring maximum weld strength at the respective weld joints. The completed electrodes may then be readily assembled by insertion through their respective tube sockets 14 without obstruction by the welded joints.

The improved welding method permits precision assembly control of the electrode parts for effecting a substantially high yield for reducing manufacturing costs. The invention may be applied to automated welding and assembly of the electrode parts using equipment specifically configured therefor.

Figure 6:
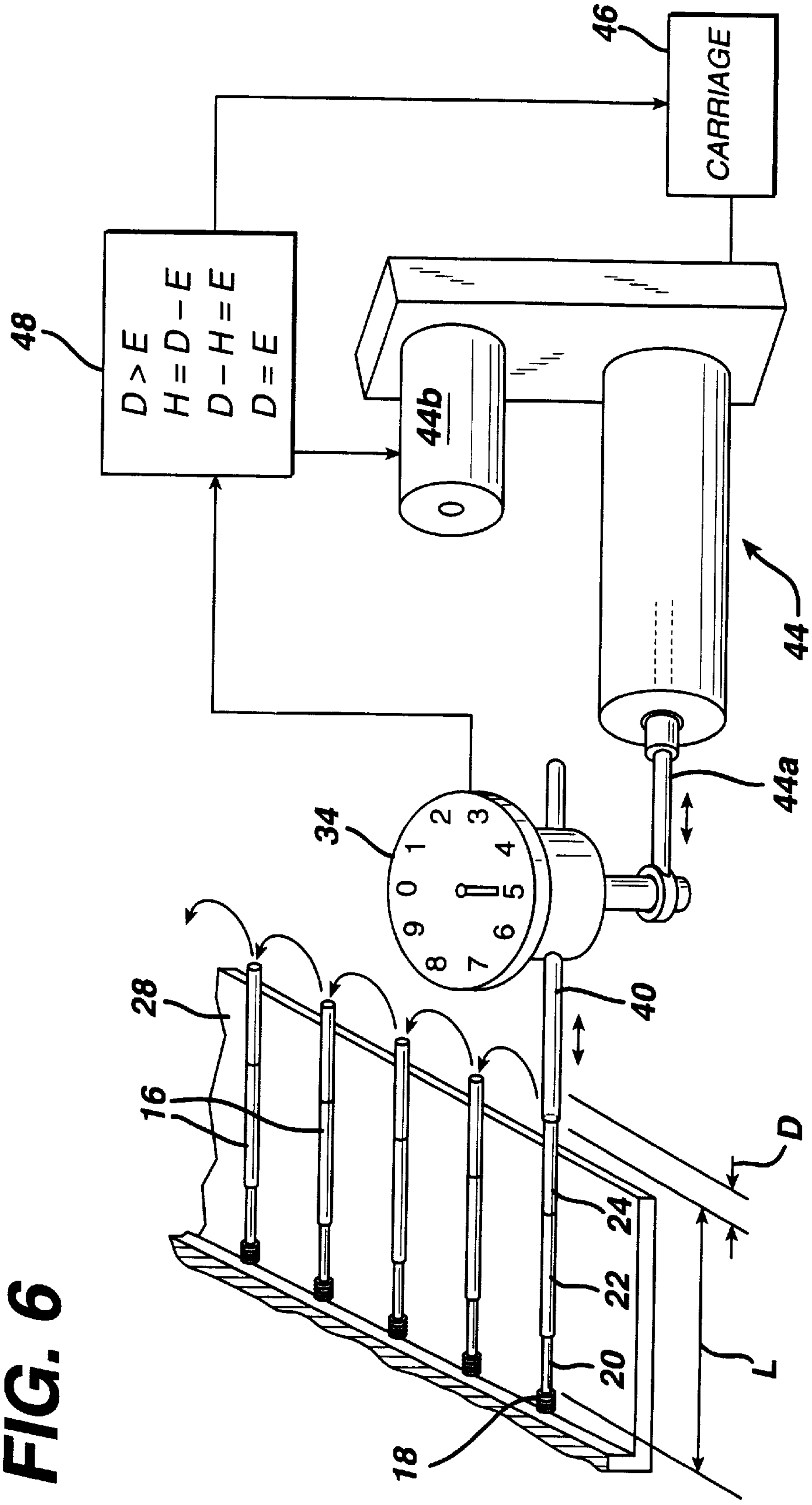
FIG. 6 is a schematic view of an apparatus for welding sets of parts in accordance with another embodiment of the invention.

For example, the different electrode parts may be individually or collectively fixtured and aligned for undergoing butt welding. An exemplary production version of the dial indicator is illustrated in FIG. 6 for repetitive welding using a suitable compression spring and cooperating extension limiter for temporarily compressing together the parts being welded with an axial contraction limit during the welding process.

In this embodiment, a plurality of sets of two parts 20–24 corresponding to multiple electrodes 16 are successively welded together. Fixture 28 may be configured to support each set of coaxially aligned parts parallel to each other in a row. The sets may then be welded one at a time at their corresponding face ends to create the resulting weld joints.

Displacement control is again used to limit axial contraction of the parts of each set at weld joints 36. The displacement control is effected by abutting retractable shaft 40 of dial indicator 34 coaxially against end part 24 for obtaining the preselected retraction thereof.

As each set is welded, dial indicator shaft 40 temporarily compresses together the parts supported in the fixture to control plastic displacement thereof. The welding sequence of coaxial alignment, welding, and controlled compression is repeated for subsequent sets of the parts in turn, with a substantially identical plastic displacement E for each parts set irrespective of different stack-up tolerances thereof.

Since two or more parts are being coaxially aligned end-to-end in the fixture 28, they are subject to corresponding manufacturing variations in size, with variation in overall length L being significant. Since the controlled plastic displacement may be as small as about 0.2 mm, length variations are critical to the accurate repeatability of the welding process.

Accordingly, the compressing means preferably also comprise a translation stage 44 supporting dial indicator 34, which translation stage 44 is effective for selectively translating dial indicator to vary retraction of shaft 40 in contact with end part 24. Stage 44 may have any conventional configuration including a selectively extendible ballscrew **44*a*, and a operatively joined stepper motor 44*b*** for precision extension thereof.

A cooperating carriage 46 supports stage 44, and is effective for repositioning stage 44 and attached dial indicator in sequence to abut in turn a series of the parts for welding. Carriage 46 may take any conventional form, such as those used in multi-axis, digitally controlled machine tools.

A programmable digital controller 48 is suitably configured in software and joined to both carriage 46 and translation stage 44 for initially driving forward ballscrew **44*a* to depress or retract shaft 40 in abutment against end part 24 in an initial retraction amount D greater than the desired axial contraction limit E. In this way, the multiple parts of each electrode 16 are forced together in abutting contact to eliminate clearance therebetween when supported in fixture 28**.

Stage 44 is then driven or retracted backwards to partially withdraw dial indicator 34 to reduce the shaft retraction depression D to an amount substantially equal to the desired axial contraction limit E. This is effected by using a dial indicator 34 with a digital readout operatively joined to the controller 48. The amount of initial retraction D of the dial indicator shaft 40 as it is depressed against the end part 24 should be suitably larger than the desired axial contraction limit E.

The initial retraction D is then read by controller 48, and an offset H is calculated by subtracting therefrom the desired contraction limit, i.e. H the dial indicator 34 the amount of the calculated offset H, i.e. D−H=E, so that the remaining retraction of dial indicator shaft 40 is equal to the desired contraction limit, i.e. D=E. Welding of the joint may then proceed, with the axial contraction thereat being limited to the remaining retraction (E) in the dial indicator.

In this way, irrespective of the actual length L of the electrode parts in each set, including the dial indicator 34 to consistently retract the shaft to the desired axial contraction limit E. This is particularly important for small contraction limits E, of about 0.2 mm for example, since manufacturing tolerances and stack-up differences may be at least this amount.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A method for laser welding together two parts comprising:

coaxially aligning said two parts at opposing face ends;

laser welding together said parts at said face ends to define a weld joint compressing together said parts in abutment at said face ends temporarily during said laser welding to control size of said weld joint;

applying a compression force through said parts to abut together said face ends;

controlling plastic displacement of said parts at said weld joint during said laser welding;

wherein said laser welding applies heat to said face ends to melt at least one of said parts thereat; and said displacement control limits axial contraction of said parts at said weld joint.

2. A method according to claim 1 wherein said axial contraction limit is effective for limiting radial expansion at said weld joint.

3. A method according to claim 2 wherein said parts have a maximum outer diameter at said face ends, and said displacement control limits radial expansion at said weld joint to about said maximum outer diameter of said face ends.

4. A method according to claim 2 further comprising removing said compression force upon reaching said axial contraction limit.

5. A method according to claim 2 wherein said two parts are refractory wires welded together to form an electrode for a ceramic metal halide lamp, and said radial expansion limit at said weld joint is selected to permit assembly of said wires through a tubular socket of said lamp without obstruction by said weld joint.

6. An apparatus for laser welding together two parts comprising:

means for coaxially aligning said two parts at opposing face ends;

means for laser welding together said parts at said face ends to define a weld joint;

means for temporarily compressing together said parts in abutment at said face ends during said laser welding to control size of said weld joint;

wherein said laser welding means are effective for applying heat to said face ends to melt at least one of said parts thereat; and said compressing means are effective for applying a compression force through said parts to abut together said face ends, and limiting axial contraction of said parts at said weld joint.

7. An apparatus according to claim 6 wherein said compressing means comprise a spring initially loaded under displacement equal to said axial contraction limit.

8. An apparatus according to claim 6 wherein said compressing means comprise a dial indicator having a spring initially loaded under displacement equal to said axial contraction limit.

9. An apparatus according to claim 6 wherein said two parts have equal outer diameters.

10. An apparatus according to claim 6 wherein said two parts have unequal outer diameters.

11. An apparatus according to claim 6 wherein said two parts are refractory wires.

12. An apparatus according to claim 11 wherein one of said parts comprises molybdenum.

13. An apparatus according to claim 12 wherein a second one of said parts comprises niobium.

14. An apparatus according to claim 12 wherein a second one of said parts comprises tungsten.

15. An apparatus according to claim 6 wherein said compressing means comprise:

a dial indicator having a retractable shaft for engaging one of said parts for compressing against another one of said parts; and a translation stage supporting said dial indicator, and effective for selectively translating said dial indicator to vary retraction of said shaft in contact with said one part.

16. An apparatus according to claim 15 further comprising a carriage supporting said stage, and effective for repositioning said stage and attached dial indicator in sequence to abut in turn a series of said parts for welding.

17. An apparatus according to claim 16 further comprising a controller configured for:

initially driving said stage to depress said shaft against said one part in an initial amount greater than said axial contraction limit; and then driving said stage to reduce said shaft depression to an amount substantially equal to said axial contraction limit.

18. A method of welding together a plurality of sets of two parts comprising:

coaxially aligning a first set of said parts at opposing face ends;

laser welding together said aligned parts at said face ends to define a weld joint;

compressing together said first set in abutment at said face ends temporarily during said laser welding to control plastic displacement thereof; and repeating said laser welding sequence for a subsequent set of said parts with a substantially identical plastic displacement irrespective of different stack-up tolerances in said part sets; wherein said displacement control limits axial contraction of said parts of each set at said weld joint thereof.

19. A method according to claim 18 wherein said displacement control is effected by abutting a retractable shaft of a dial indicator coaxially against one of said parts for obtaining a preselected retraction thereof.

20. A method according to claim 19 further comprising:

first abutting said shaft against said one part to retract said shaft greater than said preselected retraction; and partially withdrawing said dial indicator to reduce said retraction to said preselected retraction.

* * * * *